United States Patent [19]

Kihara et al.

[11] 3,802,648

[45] Apr. 9, 1974

[54] TAPE CASSETTE

[75] Inventors: Nobutoshi Kihara, Tokyo; Hiroshi Takeuchi, Yokohama, Kanagawa-ken, both of Japan

[73] Assignee: Sony Corporation, Tokyo, Japan

[22] Filed: Mar. 6, 1972

[21] Appl. No.: 232,005

[30] Foreign Application Priority Data

Mar. 8, 1971 Japan .............................. 46-14844

[52] U.S. Cl. ........ 242/199, 179/100.2 ZA, 274/4 C

[51] Int. Cl. ...................... G11b 23/08, G11b 15/66

[58] Field of Search ........... 242/199, 200, 198, 197, 242/194, 71.2, 71.1; 179/100.22 A, 100.22; 274/4 C, 4 B, 11 C, 11 B

[56] References Cited

UNITED STATES PATENTS

| | | | |
|---|---|---|---|
| 2,106,374 | 1/1938 | Goldhammer et al. ............ | 242/71.2 |
| 3,989,261 | 6/1961 | Gillette et al. .................. | 242/200 X |
| 3,642,225 | 2/1972 | Kakichi et al. .................. | 242/199 X |
| 3,672,603 | 6/1972 | Swain ............................. | 242/198 X |

*Primary Examiner*—George F. Mautz

*Attorney, Agent, or Firm*—Lewis H. Eslinger, Esq.; Alvin Sinderbrand, Esq.

[57] ABSTRACT

A magnetic tape cassette having a generally rectangular housing in which one of the walls of the housing has a cut out portion to receive a guide pin from the tape apparatus which draws the tape from the cassette, the cassette further including a flexible tape supporting member to properly position the tape in the cut out portion in order to receive the guide pin.

6 Claims, 5 Drawing Figures

TAPE CASSETTE

BACKGROUND OF THE INVENTION

1. Field of the Invention

The invention relates to tape cassettes for use on tape recording and/or reproducing apparatus. More particularly the invention is directed to an improvement in tape cassettes of the type wherein the tape is drawn out of the cassette housing in order to engage with the tape recording and/or reproducing apparatus.

2. Description of the Prior Art

The use of tape cassettes is steadily expanding and has been extended to apparatus of the type having a rotary magnetic head contained within a tape guide drum such as in a video tape recorder. In many such video tape recorders it is necessary to draw the tape from the cassette and place it around the guide drum. A tape cassette for use in such a video tape recorder has an opening in its housing into which a guide pin on the video tape apparatus is inserted after the cassette is placed in the video tape recorder.

The tape is carried within such cassettes by two spaced-apart supply and take-up reels. The cut out portion of the cassette housing connects with an opening in the side wall of the cassette housing and is positioned such that the guide pin from the video tape apparatus enters the housing behind the tape. Unless the tape is maintained in tension between the supply and take-up reels it has a tendency to become loose and improperly positioned in the cut out portion of the housing. With the tape loose in the cut out portion of the housing the guide pin may not correctly engage the tape on its backside and thus be unable to draw a loop of tape from the cassette.

SUMMARY OF THE INVENTION

The above and other problems are overcome by the cassette of the present invention which is removably insertable into a recording or reproducing apparatus of the type having a guide member for drawing a portion of the tape from the cassette. The cassette comprises a housing for containing the magnetic tape, the housing having an opening for the insertion of the guide member after the cassette is placed into the recording or reproducing apparatus and to permit the passage therethrough of the tape when drawn by the guide member. The housing further contains a flexible tape support member to properly position a portion of the tape within the opening for engagement with the guide member.

In one embodiment the flexible support member is a strip attached at one end to the housing and having its other end free. The flexible support is substantially flat and is oriented in a plane which is parallel to and spaced apart from the plane in which that portion of the tape engaged by the guide member lies. The free end of the support is slightly tapered to prevent the support from vibrating against the moving tape.

In some embodiments the side of the flexible tape support which faces the magnetic tape has a low friction layer. In still another embodiment the side of the flexible tape support facing the magnetic tape has a brush member for cleaning the tape when the tape is moving. In all embodiments the housing may advantageously include a lid which is spring operated to cover at least a part of the opening when the cartridge is not inserted within the video tape apparatus so that the tape is positioned between the closed lid and the flexible tape support member.

It is therefore one object of the invention to provide a tape cassette having a flexible tape support member to properly position the tape within the cut out portion of the cassette housing in order to receive the guide pin from the video tape apparatus.

It is another object of the invention to provide a cassette having a flexible tape support member within the housing which additionally serves to clean the tape during the rewind mode.

Other objects, features and advantages of the invention will become apparent from the following description taken in conjunction with the accompanying drawings.

DESCRIPTION OF THE PREFERRED EMBODIMENTS

Figure 1:
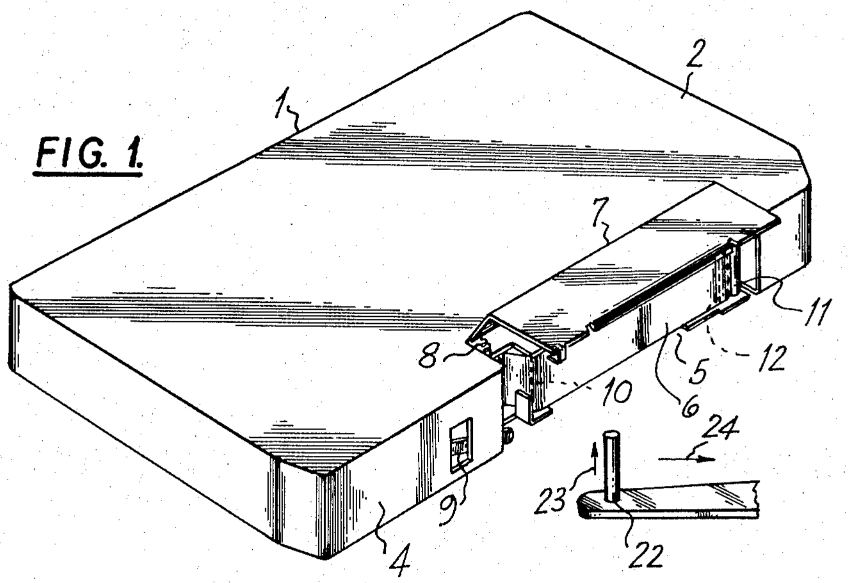
FIGS. 1 and 2 are perspective views of one embodiment of a tape cassette according to the invention.
Figure 2:
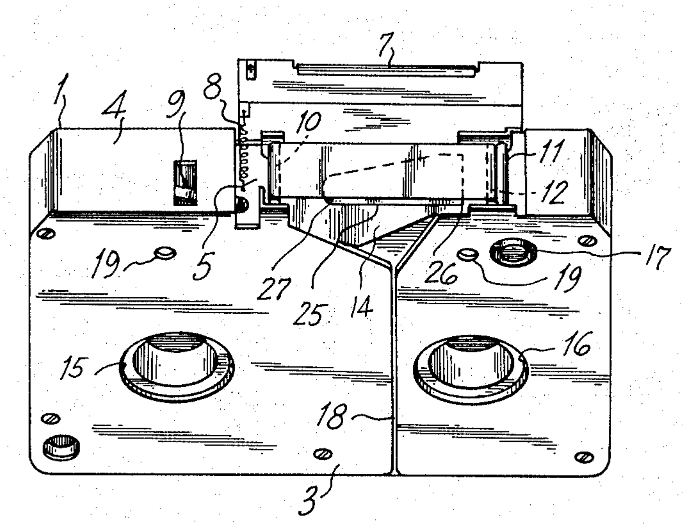

With reference to FIGS. 1 and 2 the cassette according to one preferred embodiment of the invention comprises a housing 1 that consists of substantially flat, parallel top and bottom walls 2 and 3 and a generally rectangular side wall 4 connecting them with each other. The side wall 4 has an opening 5 in one of its faces for drawing out a magnetic tape 6 contained within the housing 1. A lid 7 is provided for covering the opening 5 when the cassette is not inserted into the tape recording/reproducing apparatus. The lid 7 is biased by a spring 8 to normally cover the opening 5 and is locked by a locking means 9. The lid is unlocked and opened by a mechanism within the video tape apparatus after the cassette is inserted.

Guides 10, 11 and 12 are mounted in the housing 1 to position the tape 6 and facilitate its travel when the tape 6 is drawn from the cassette and placed about the record/playback head of the video tape apparatus (not shown). The guide 10 is mounted in the housing 1 at the left hand end of the opening 5 as viewed in FIG. 2 and is oriented perpendicularly to the direction of tape travel. The guides 11 and 12 are mounted in the housing 1 at the opposite end of the opening 5 and are parallel to and spaced apart from each other, with the tape passing between them. The tape 6 passes across the opening 5 by traveling over the guides 10 and 12.

The bottom wall 3 has a triangular cut out portion 14 which connects with the opening 5 in the side wall 4. The cut out portion 14 receives a guide pin from the tape recording/reproducing apparatus after the cassette is inserted therein as is explained in further detail below. An extension 13 of the sidewall 4 joins the edges of the cut out portion 14 to the inner surface of the opposite flat wall 2. The bottom wall 3 also has apertures 15 and 16 to provide driving access for tape reels 20 and 21 housed in the cassette. The wall 3 includes means 17 to prevent accidental erasure and a groove 18 and apertures 19 which engage corresponding protrusions on the recording/reproducing apparatus for fixing the position of the cassette when it is mounted on the apparatus.

Figure 3:
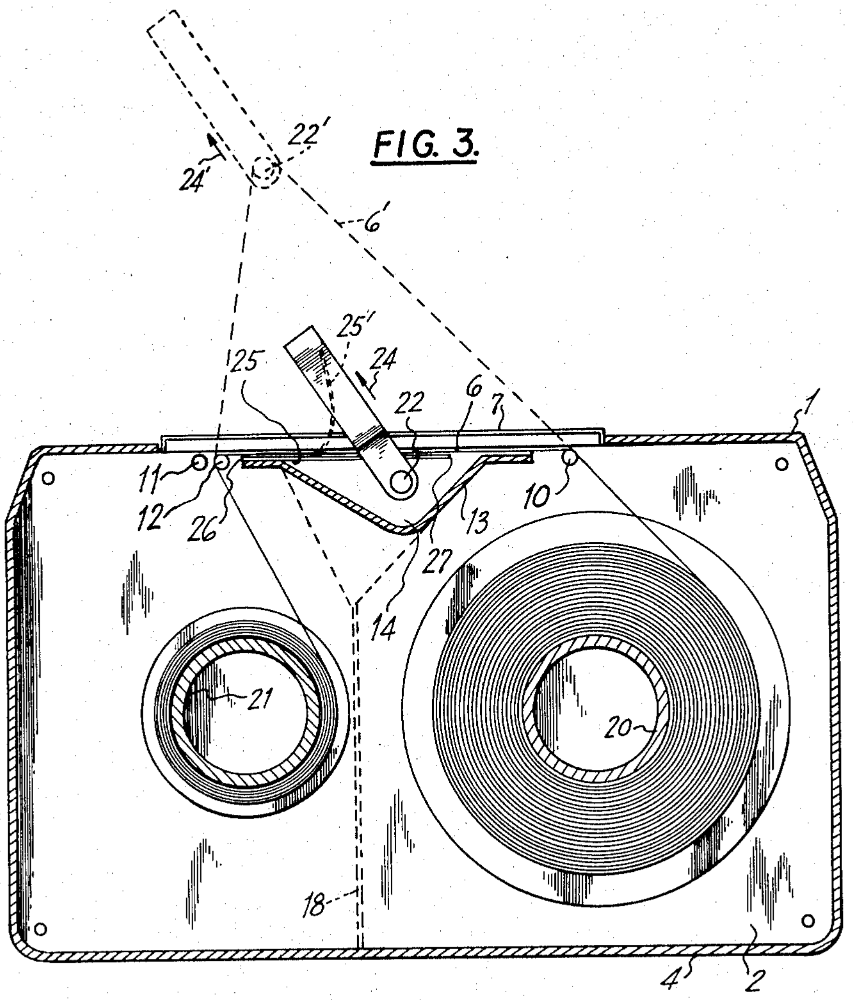
FIG. 3 is a plan view, partly in cross-section of the embodiment in FIGS. 1 and 2.

Referring now to FIG. 3 a supply reel 20 and a take-up reel 21, each having opposite ends of the magnetic tape 6 wound thereon, are disposed in a predetermined spaced relation to each other and are mounted for rotation in the cassette housing 1. The reels 20 and 21 each receive driving shafts from the video tape apparatus (not shown) when the cassette is put into the machine.

After the cassette is inserted in the machine a guide pin 22 from the machine is extended into the opening 14 behind the tape 6 as indicated by the directional arrow 23 in FIG. 1. The guide pin 22 is withdrawn outwardly from the cassette, as indicated by the direction arrow 24 in FIGS. 1 and 3, to pull a loop 6′ of tape from the cassette which the guide pin 22 ultimately wraps about the periphery of the drum containing the recording head (not shown). The position of the tape loop 6′ as it is being drawn from the cassette is shown in dotted line fashion in FIG. 3 for purposes of illustration.

In order to prevent a portion of loose tape from gathering in the opening 14 prior to the insertion of the cassette into the video tape apparatus a flexible support member 25 is mounted in the housing 1 adjacent to the opening 5 to properly position the tape 6 for engagement with the guide pin 22. The flexible support member 25 is comprised of a substantially flat strip or sheet of resilient material such as polyester which is mounted at one end of its ends 26 to the housing 1 and extends across the opening 5. The other end 27 of the strip is free. The support 25 is oriented with its flat sides parallel to the flat surface of the portion of the tape 6 which faces toward the reels 20 and 21. Because the support 25 is resilient the tape 6 is held clear of the opening 14 and facing the opening 5.

Thus when the guide pin 22 is inserted into the opening 14 it properly engages the backside of the tape 6. When the guide pin 22 is withdrawn in the direction indicated by the arrow 24′ to the position 22′, shown in dotted line fashion in FIG. 3 for purposes of illustration, the flexible support 25 is bent outwardly to a position shown as 25′. When the tape loop is withdrawn back into the cassette the flexible tape support member 25 returns to its original position because of its elasticity.

As the tape is being wound within the cassette in either the fast forward direction or the rewind direction the flexible tape support member 25 has occasion to be rubbed by the moving tape. In order to reduce any vibration caused by the movement of the tape support due to engagement with the running tape the end of the tape support member is tapered toward its free end 27. By making the free end 27 of the tape support of a small area and of lightweight the tendency for it to vibrate against the moving tape is greatly lessened.

Figure 4:
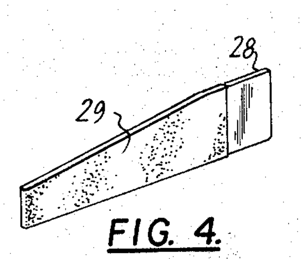
FIG. 4 is a perspective view of the flexible tape support member of another embodiment of the invention.

Referring now more particularly to FIG. 4 in still another embodiment a flexible tape support 28 has its exterior surface, that is the surface which contacts the tape, coated with a layer of low friction material 29 such as carbon or a mixture of carbon and a synthetic resin polymer such as polytetrafluoroethylene (available under the trade name of "Teflon"). The coating 29 of low friction material prevents the rubbing of the tape from causing the support 28 to vibrate.

Figure 5:
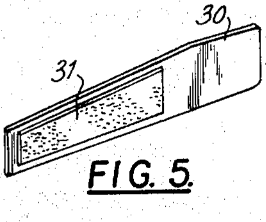
FIG. 5 is a perspective view of the tape support member of a third embodiment of the invention.

Referring now to FIG. 5 still another modified tape support 30 is illustrated having a brush 31 on its exterior surface which contacts the tape 6. The brush may be made of a thin film of felt material, for example, and its purpose is to remove dust or other foreign material from the surface of the tape when the tape is running.

Although all of the foregoing embodiments have been described in reference to a cassette for use in a video, magnetic tape apparatus is should be apparent that a cassette according to the invention may be used in any operation where it is necessary to draw a loop of tape out of the cassette and into a recording or playback apparatus.

The terms and expressions which have been employed here are used as terms of description and not of limitation, and there is no intention in the use of such terms and expressions, of excluding equivalents of the features shown and described, or portions thereof, it being recognized that various modifications are possible within the scope of the invention claimed.

What is claimed is:

1. A cassette for housing a tape wound on reels, the cassette being removably insertable into a recording or reproducing apparatus of the type having tape engaging means for engaging a portion of the tape within the cassette and for drawing it from the cassette, the cassette comprising a. a housing having top, bottom and side walls, said side wall having an opening along a portion thereof, guide means in said housing adjacent opposite ends of said opening for directing a run of the tape in a path along said opening, at least one of said top and bottom walls having a cutout therein communicating with said opening for insertion of the tape engaging means into the housing through said cutout at the inner side of said path when the cassette is placed in the recording and reproducing apparatus and for permitting the tape engaging means to move out of the housing through said opening for withdrawal of the tape from the cassette by the tape engaging means, and b. an elongated strip of resiliently flexible material mounted only at one end within said housing and having at least its free end portion normally positioned along a portion of said opening at the inner side of said path for preventing inward buckling of said run of the tape from said path so that, when the tape engaging means are inserted into said cutout, said portion of the flexible strip is between the tape engaging means and said run of the tape, the strip further being sufficiently flexible that it is capable of bending outwardly of the housing through said opening as the tape engaging means withdraws the tape through the opening and then returning to its original position.

2. A cassette as recited in claim 1, wherein the resiliently flexible strip is tapered at its free end.

3. A cassette as recited in claim 1, wherein the resiliently flexible strip has a layer of low friction material on its free end portion.

4. A cassette as recited in claim 3 wherein the layer of low friction material consists essentially of a mixture of a synthetic resin polymer and carbon.

5. A cassette as recited in claim 1, wherein the resiliently flexible strip has a brush thereon for cleaning the tape when it is moving and said resiliently flexible strip yieldably holds the brush against at least one surface of the tape in said path.

6. A cassette as recited in claim 1, further comprising a lid mounted on the housing and operative to cover at least a portion of said opening in the side wall of said housing, a spring connected between the lid and the housing for holding the lid normally closed, the closed lid and the resiliently flexible strip forming a slot therebetween for positioning said run of the tape in said slot.

* * * * *